United States Patent [19]
Sano et al.

[11] Patent Number: 5,212,439
[45] Date of Patent: May 18, 1993

[54] CHARGING APPARATUS WITH BATTERY VOLTAGE MONITORING CIRCUITRY

[75] Inventors: Masato Sano, Sumoto; Toru Morioka, Hyogo, both of Japan

[73] Assignee: Sanyo Electric Co., Ltd., Moriguchi, Japan

[21] Appl. No.: 679,485

[22] Filed: Apr. 2, 1991

[30] Foreign Application Priority Data

Apr. 5, 1990 [JP] Japan ................... 2-90904

[51] Int. Cl.$^5$ .............................................. H02J 7/04
[52] U.S. Cl. ......................................... 320/39; 320/20
[58] Field of Search .................... 320/20, 21, 22, 23, 320/24, 37, 38, 39, 40, 31, 32

[56] References Cited

U.S. PATENT DOCUMENTS

| | | | |
|---|---|---|---|
| 3,748,567 | 7/1973 | Arai et al. | 320/22 |
| 4,091,320 | 5/1978 | Foster | 320/40 |
| 4,118,661 | 10/1978 | Siekieriski et al. | 320/40 |
| 4,163,933 | 8/1979 | Foster | 320/20 |
| 4,213,081 | 7/1980 | Taylor | 320/40 |
| 4,392,101 | 7/1983 | Saar et al. | 320/20 |
| 4,418,310 | 11/1983 | Bollinger | 320/39 |
| 4,806,840 | 2/1989 | Alexander et al. | 320/20 |
| 5,013,992 | 5/1991 | Eavenson et al. | 320/31 |

FOREIGN PATENT DOCUMENTS

| | | |
|---|---|---|
| 3334851 | 4/1985 | Fed. Rep. of Germany . |
| 53-103544 | 9/1978 | Japan . |
| 2-74127 | 3/1990 | Japan . |

Primary Examiner—Steven L. Stephan
Assistant Examiner—Kristine Peckman
Attorney, Agent, or Firm—Armstrong, Westerman, Hattori, McLeland & Naughton

[57] ABSTRACT

The charging apparatus for charging a secondary battery by controlling the charging current on the basis of the change with time of the voltage of the secondary battery through sampling of the voltage. The voltage of the secondary battery is sampled by use of a voltage/frequency converter which converts the voltage of the secondary battery to pulses of a frequency corresponding to the voltage and a counter which counts the converted pulses for a predetermined time with a predetermined cycle. The counting time of the counter is set to be larger than half a cycle of a commercial alternating current source used as a charging power source. Short duration fluctuations in the battery voltage due to charging power source variations are compensated for because the average voltage during this time is converted to digital values, thus making it possible to sample the voltage of the secondary battery correctly without being influenced by the change of the voltage of the power source.

10 Claims, 7 Drawing Sheets

CHARGING APPARATUS WITH BATTERY VOLTAGE MONITORING CIRCUITRY

BACKGROUND OF THE INVENTION

1. Field of the Invention

This invention relates to a charging apparatus for use in an appliance accommodating a secondary battery therein or a charging apparatus for charging a secondary battery, and more particularly, to a charging apparatus of the type controlling the charging current through detection of the change of voltage of the secondary battery during charging.

2. Description of Related Art

The voltage of a secondary battery such as an Ni-Cd battery or the like rises as the battery is charged, and drops when it is fully charged. Charging apparatus already in the market makes use of this characteristic of the voltage change to control charging current of the secondary batteries. That is, the charging current is reduced or the charging is stopped when the voltage of the secondary battery starts to fall from the maximum point.

An example to control the charging current in the manner as above through detection of the voltage change of the secondary battery is revealed in Japanese Patent Application Laid-Open 103544(1978), U.S. Pat. No. 4,806,840, etc. According to the disclosures, the voltage of the secondary battery is sampled with a predetermined cycle, and two consecutive voltage samples are compared, thereby detecting when the secondary battery is fully charged. In this case, the voltage is sampled by an A/D converter which converts the voltage of the secondary battery from analog signals to digital signals.

Meanwhile, the voltage of a commercial alternating current used as a charging power source varies in some cases due to power ripples or the overlap of external noises. These noises are often overlapped with the loop or node portion appearing every half a cycle of the commercial alternating current of a sine wave. When the secondary battery is charged with the voltage of this charging power source which is overlapped with the above-mentioned noises, the voltage of the secondary battery varies, which leads to the generation of jitters when the voltage is converted to digital signals. In other words, since the voltage of the secondary battery is detected momentarily in the conventional manner, the detection may result in error from the above-described voltage variations of the power source depending on the timing of the sampling.

Further, according to the charging apparatus disclosed in U.S. Pat. No. 4,806,840, the charging is finished when the sampled voltage falls two times in succession. Therefore, if the sampled voltage is varied subsequent to the voltage change of the power source after the secondary battery is fully charged, it is impossible to control the charging.

SUMMARY OF THE INVENTION

One object of this invention is to provide a charging apparatus capable of sampling the voltage of a secondary battery correctly even when the voltage varies rapidly due to the momentary change of the voltage of a charging power source.

Another object of this invention is to provide a charging apparatus capable of positively controlling the charging of a secondary battery even when the voltage of a charging power source is momentarily changed.

According to the charging apparatus of this invention, the voltage of a secondary battery is sampled by a voltage/frequency converter which converts the voltage of the secondary battery to pulses of a frequency corresponding to the voltage, and a counter which counts the converted pulses with a predetermined cycle for a predetermined time period. The counting number of the counter is a digital value indicating the average voltage of the secondary battery within the counting period. Even if the voltage of the secondary battery varies due to the change in the voltage of a charging power source during the counting period, the average voltage of the secondary battery is converted to a digital value, and accordingly, the influences of the voltage change of the charging power source can be remarkably reduced, thereby ensuring correct sampling of the voltage.

The counting time period by the counter is set larger than half a cycle of a commercial alternating current used as the charging power source. Therefore, the effective value of the voltage of the commercial alternating current is rendered almost constant regardless of the timing of the sampling, and the influences of the overlapping external noises can be almost uniformly reduced.

Since the charging time or the increasing/decreasing amount of the voltage of the secondary battery for the charging time are different depending on the capacity or the charging current of the secondary battery, it is desirable to change the sampling cycle of the voltage (counting cycle by the counter) in accordance with the capacity or the charging current of the secondary battery.

If the counting by the counter is inhibited for a set time after the start of the charging, it becomes possible to prevent an erroneous control of the charging at the initial stage of charging the secondary battery in the inactive state which is left discharging for a long time.

Moreover, if the charging is forcibly controlled a predetermined time later from the start of the charging, it becomes possible to prevent the secondary battery from being overcharged by an improper charging operation or the like.

The above and further objects and features of the invention will more fully be apparent from the following detailed description with accompanying drawings.

DESCRIPTION OF THE PREFERRED EMBODIMENTS

A charging apparatus according to this invention will be discussed more in detail with reference to the accompanying drawings.

Figure 1:
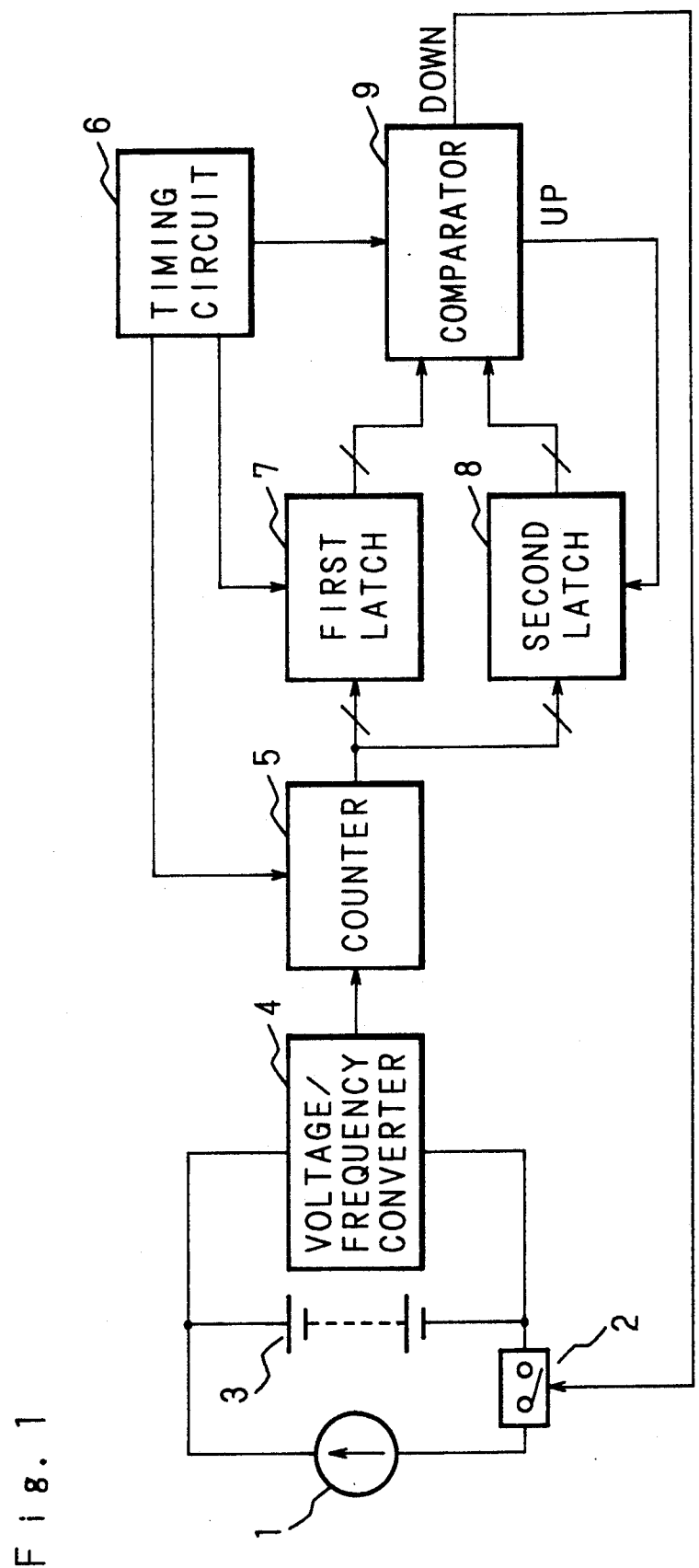
FIG. 1 is a block diagram showing the structure of a charging apparatus according to a first embodiment of this invention.

Referring first to FIG. 1 showing the structure of a charging apparatus according to a first embodiment of this invention, a secondary battery 3, for example, Ni-Cd battery to be charged is connected, through a charging control circuit 2, to both ends of a charging power source 1 which consists of a commercial alternating current source and a rectifying circuit. A voltage/frequency converter 4 connected with both ends of the secondary battery 3 converts the voltage of the secondary battery 3 to pulses of a frequency corresponding to the voltage. The pulses obtained in the converter 4 are counted with a predetermined cycle by a counter 5 for only a predetermined time period. The predetermined cycle and predetermined time period are set, e.g., approximately 30 seconds and one second, respectively, in charging the secondary battery 3 for one hour. The counting timing is controlled by clock pulses outputted from a timing circuit 6.

The counting number of the counter 5 is outputted to a first latch 7 and a second latch 8. Both latches 7, 8 temporarily store the digital values of the counting number and then output to a comparator 9. The first latch 7 changes the value stored therein every time the counter 5 outputs the counting number corresponding to the voltage of the secondary battery 3 thereto. On the other hand, the second latch 8 changes the value stored therein to the value of the first latch 7 only when an UP signal is outputted thereto from the comparator 9.

In the comparator 9, the outputs from the first and second latches 7, 8 are compared with a predetermined cycle. When the output from the first latch 7 (digital value stored in the first latch 7) is higher than the output from the second latch 8, the UP signal is outputted from the comparator 9 to the second latch 8. On the contrary, when the output from the first latch 7 (digital value stored in the first latch 7) is lower than the output from the second latch 8, a DOWN signal is outputted from the comparator 9 to the charging control circuit 2.

The UP signal outputted from the comparator 9 is a rewriting signal so as to update the stored value in the second latch 8. When this UP signal is inputted to the second latch 8, the stored value in the second latch 8 is changed to the value of the first latch 7. If the DOWN signal is inputted, the charging control circuit 2 stops the charging of the secondary battery 3.

Figure 2:
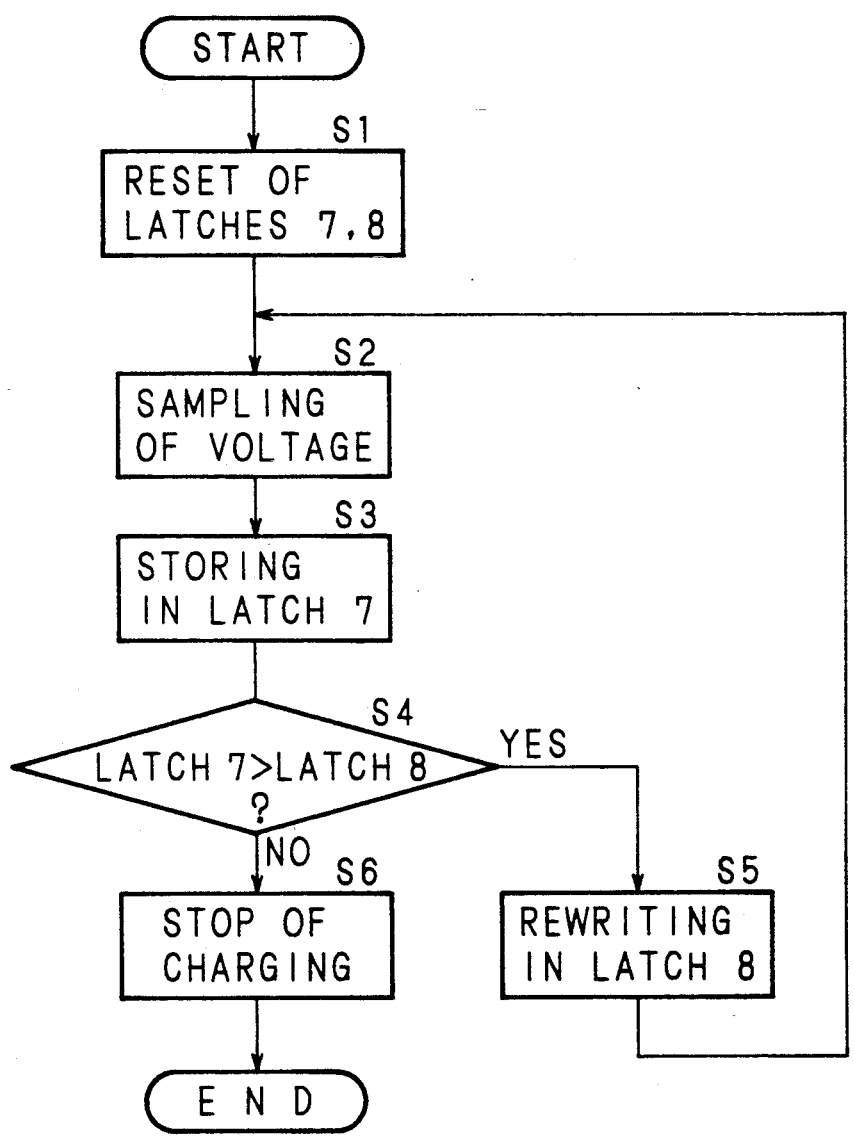
FIG. 2 is a flow chart showing the operating procedures of the apparatus of FIG. 1.

The operation of the charging apparatus will be discussed with reference to a flow chart of FIG. 2. At the start of the charging for the secondary battery 3, both the first and the second latches 7, 8 are reset (S1). The voltage of the secondary battery 3 is sampled with a predetermined cycle by the voltage/frequency converter 4 and the counter 5(S2). The counting number corresponding to the sampled voltage is stored in the first latch 7(S3). Then, the stored value in the first latch 7 is compared with that in the second latch 8 by the comparator 9 (S4). In the case where the stored value in the first latch 7 is larger than that in the second latch 8, the UP signal is outputted from the comparator 9, and the stored value in the second latch 8 is changed to the value stored in the first latch 7 (S5). Thereafter, the procedures in S2, S3, S4 are repeated. In the case where the stored value in the first latch 7 is smaller than that in the second latch 8, the DOWN signal is outputted from the comparator 9, so that the charging of the secondary battery 3 is stopped by the charging control circuit 2 (S6).

In the manner as described above, as the charging of the secondary battery 3 proceeds, the voltage of the secondary battery 3 keeps increasing until the secondary battery 3 is fully charged. When the secondary battery 3 is fully charged and the voltage of the secondary battery 3 becomes lower, the charging of the secondary battery 3 is stopped.

The counting number of the counter 5 which counts the pulses generated from the voltage/frequency converter 4 with a predetermined cycle is equivalent to the average voltage of the secondary battery 3 converted to digital values within the counting time period. Therefore, even if the voltage of the secondary battery 3 is momentarily charged due to the variation of the voltage of the charging power source 1 within the counting time period, the digital values are hardly influenced by the voltage change of the charging power source 1.

Moreover, the counting time period is approximately one second, that is, about 60 cycles of the commercial alternating current when the secondary battery 3 is quickly charged for one hour. The effective value of the voltage of the charging power source 1 during the counting time period is almost constant irrespective of the timing with which the voltage of the secondary battery 3 is sampled, and accordingly, the influences of the overlapping external noises can be nearly uniformly reduced.

Figure 3:
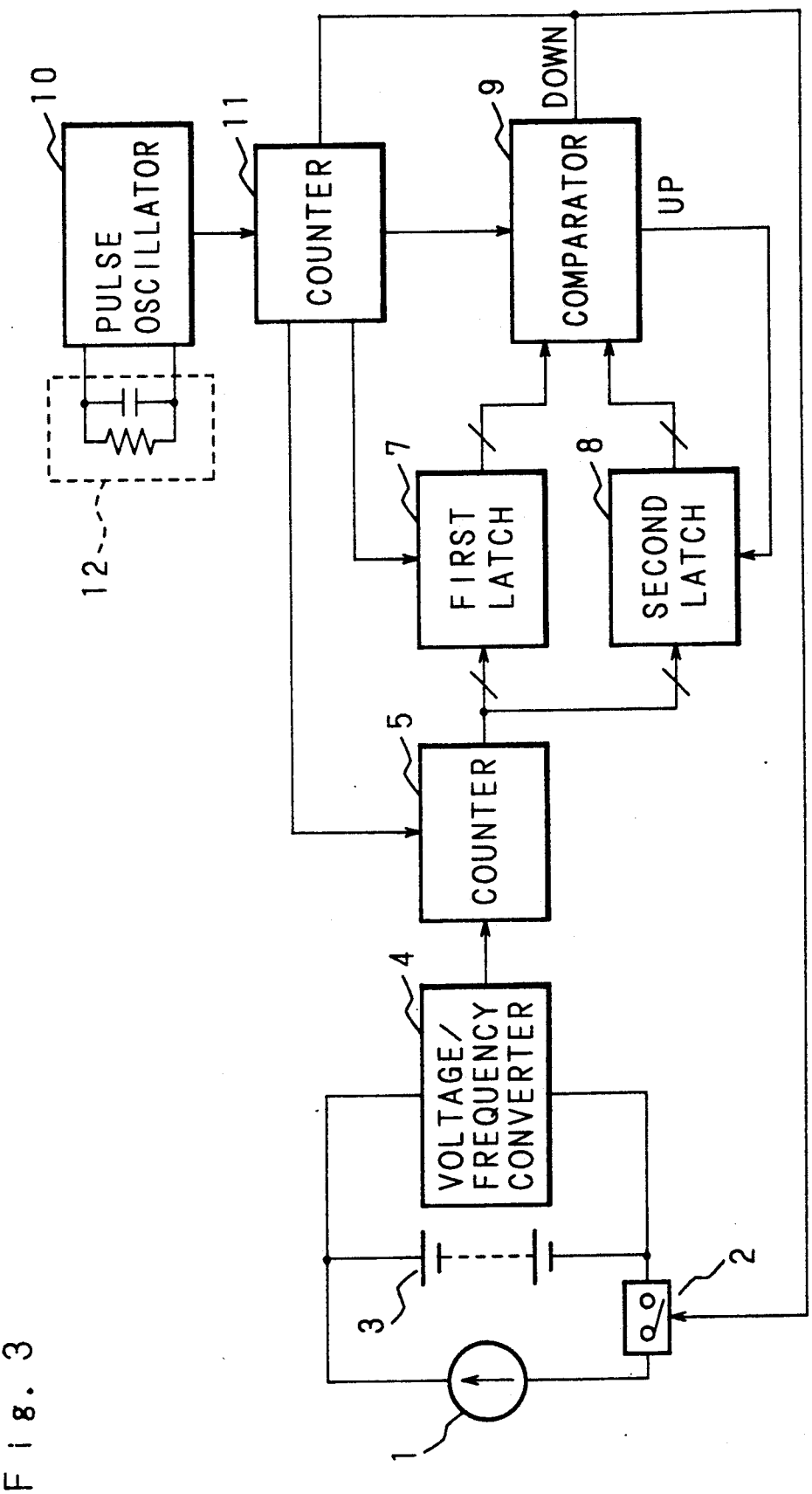
FIG. 3 is a block diagram showing the structure of a charging apparatus according to a second embodiment of this invention.

A charging apparatus according to a second embodiment of this invention is shown in FIG. 3, which is an improvement of the first embodiment. In the charging apparatus of the second embodiment, the timing circuit 6 in FIG. 1, i.e., in the first embodiment is constituted of a pulse oscillator 10 and a counter 11. A setting circuit 12 for setting an oscillating frequency is connected to the pulse oscillator 10, in which a capacitor C and a resistance R are connected in parallel. The counter 11 outputs a signal to the counter 5 for inhibiting the monitoring of the voltage, a signal to the first latch 7 for storing the voltage, and a signal to the charging control circuit 2 for controlling the charging of the secondary battery 3, respectively. The purpose of theses signals outputted from the counter 11 will be discussed hereinbelow.

The internal resistance may be extraordinarily high in the secondary battery 3 in the inactive state after it is left discharging for a long time. When such secondary battery 3 as above is charged, the internal resistance is restored to the normal value at the initial stage of the charging, and the voltage of the secondary battery 3 is lowered. Consequently, if the DOWN signal is outputted from the comparator 9 in response to the decrease of the voltage, it inconveniently happens that the charging is interrupted. In order to avoid the inconvenience, the signal for inhibiting the monitoring of the voltage is outputted to the counter 5 for a first preset time from the start of the charging, thereby stopping the monitoring of the voltage of the secondary battery 3.

The charging time or the increasing/reducing amount of the voltage of the secondary battery 3 for the charging time differs depending on the capacity or the charging current of the secondary battery 3. Therefore, the signal for storing the voltage is outputted to the first latch 7 so as to set the sampling cycle of the voltage to a second preset time in accordance with the capacity or the charging current of the secondary battery 3.

The charging time of the secondary battery 3 may extend longer than the proper time by some reasons, which can cause an overcharging of the battery. The signal for controlling the charging is thus outputted to the charging control circuit 2 to forcibly control the charging a third preset time later from the start of the charging.

The above-mentioned first, second and third preset times are determined by the setting circuit 12. The setting circuit 12 can be easily switched to the pulse oscillator 10, and the setting value of the setting circuit 12 can be easily changed corresponding to the capacity or the charging current of the secondary battery 3. Accordingly, if the charging apparatus except the setting circuit 12 is formed into a unit, the unit is used in common for various kinds of chargers having a different capacity or a different charging current.

A charging apparatus according to a third embodiment of this invention will be described below.

Figure 4:
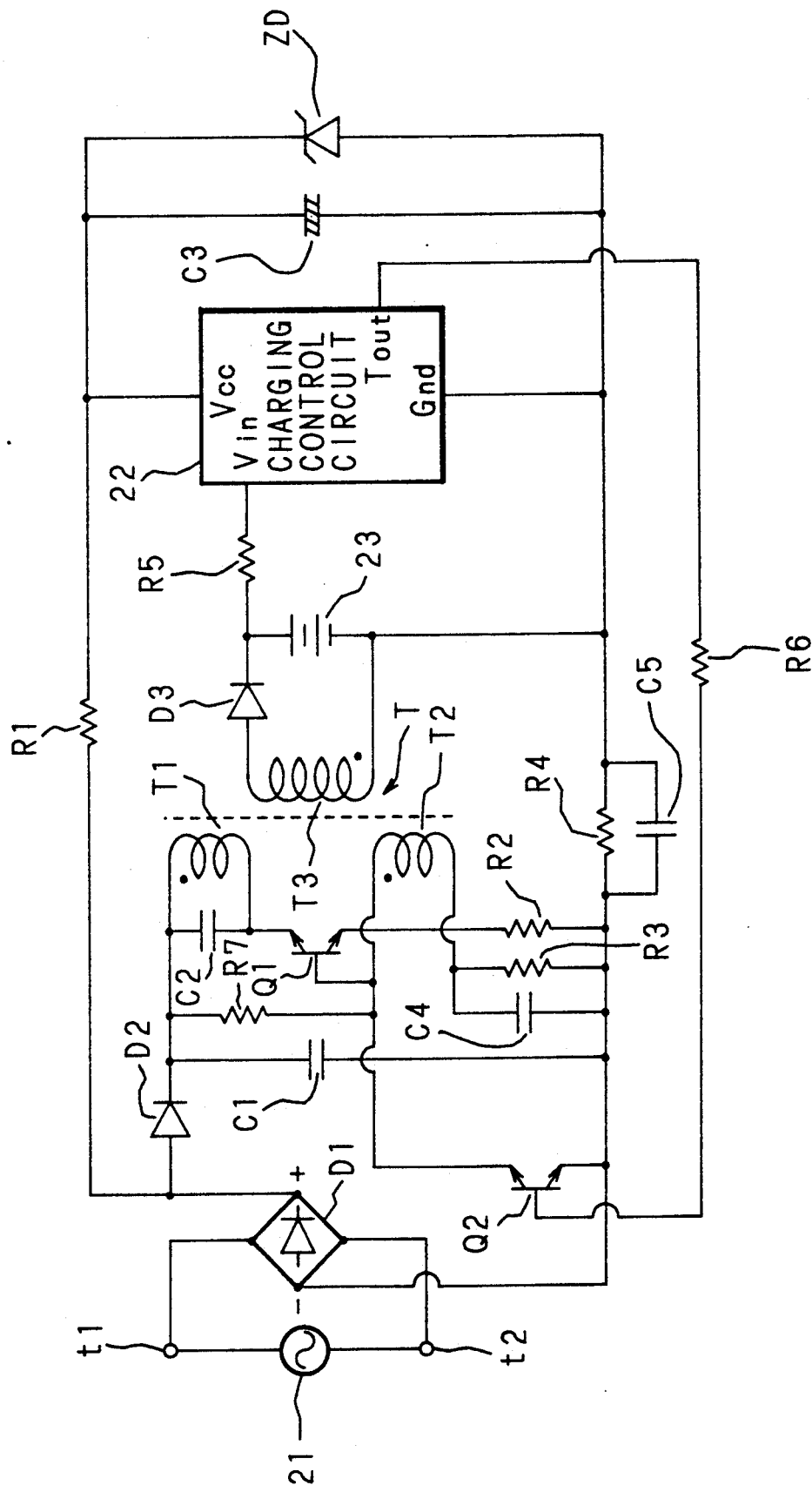
FIG. 4 is a circuit diagram of a charging apparatus according to a third embodiment of this invention.

In FIG. 4 showing a circuit diagram of the charging apparatus of the third embodiment, an alternating current source 21 is connected between power source terminals t1 and t2. The power terminal t1 and t2 are connected with alternating input terminals of a rectifying bridge D1. A diode D2 has its anode connected to a (+) DC output terminal of the rectifying bridge D1. A series circuit comprised of the diode D2 and a smoothing capacitor C1 is intervened between the (+) DC output terminal and a (−) DC output terminal of the rectifying bridge D1. A series circuit comprised of a resistance R2, a transistor Q1 and a parallel circuit consisting of a first primary winding T1 of a high-frequency transformer T and a capacitor C2 is connected in parallel to the smoothing capacitor C1. Moreover, a series circuit comprised of a resistance R7, a second primary winding T2 of the transformer T and a parallel circuit consisting of a resistance R3 and a capacitor C4 is connected in parallel to the smoothing circuit C1. The transistor Q1 has its base connected to a contacting point between the resistance R7 and the second primary winding T2 and, to a collector of a transistor Q2. The transistor Q2 has its emitter connected to the (−) DC output terminal of the rectifying bridge D1, and its base connected to an output terminal Tout of a charging control circuit 22 through a resistance R6.

Between both terminals of a secondary winding T3 of the high-frequency transformer T, there is connected a series circuit comprised of a diode D3 having its anode at the side of the secondary winding T3 and a secondary battery 23, for example, Ni-Cd battery to be charged. A (+) terminal of the secondary battery 23 is connected to an input terminal Vin of the charging control circuit 22 via a resistance R5, with a (−) terminal thereof connected to a grounding terminal Gnd of the charging control circuit 22.

The (+) output terminal of the rectifying bridge D1 is connected to a power source terminal Vcc of the charging control circuit 22 through a resistance R1, and the (−) output terminal thereof is connected to the grounding terminal Gnd through a parallel circuit comprised of a resistance R4 and a capacitor C5. A parallel circuit comprised of a capacitor C3 and a Zener diode ZD is intervened between the power source terminal Vcc and the grounding terminal Gnd. The capacitor C3 and Zener diode ZD supply a constant voltage to the power source terminal Vcc of the charging control circuit 22.

In the next place, the operation of this charging apparatus will be discussed. When an alternating current voltage of the alternating current source 21 is rectified by the rectifying bridge D1, the smoothing capacitor C1 is charged by this direct current voltage, and a voltage is applied to the power source terminal Vcc of the charging control circuit 22. The voltage of the smoothing capacitor C1 allows a current to run to the second primary winding T2 through the resistance R7, so that the capacitor C4 is charged and the base voltage of the transistor Q1 is raised. When the base voltage reaches a predetermined value, the transistor Q1 is turned ON, allowing a current to run to the first primary winding T1 and resistance R2 thereby generating a voltage at the second primary winding T2. The base current of the transistor Q1 is further increased because of the generated voltage at the second primary winding T2. As a result, the current flowing in the first primary winding T1 is increased to saturate the core of the transformer, when no voltage is generated at the second primary winding T2. Thus, the base current of the transistor Q1 is decreased. Consequently, the current running in the first primary winding T1 is reduced. At this time, a voltage is generated in the second primary winding T2 in a direction to apply an inverse voltage between the base and emitter of the transistor Q1, whereby the transistor Q1 is suddenly turned OFF. As the transistor Q1 is repeatedly turned ON and OFF in the above manner, the current intermittently flows in the first primary winding T1, with inducing an alternating current voltage to the secondary winding T3. The alternating current voltage is rectified by the diode D3 and the secondary battery 23 is charged by the resulting direct current voltage. The terminal voltage of the secondary battery 23 is inputted to the input terminal Vin of the charging control circuit 22, which in turn detects the terminal voltage of the secondary battery 23. When the terminal voltage of the secondary battery 23 is reduced after it is increased as the battery is charged, that is, the battery is completely charged, a charging end signal of [H] level is outputted from the output terminal Tout. Subsequently, the transistor Q2 is turned ON, so that the base of the transistor Q1 and the terminal of the capacitor C4 are connected with the (−) DC output terminal of the rectifying bridge D1. Accordingly, the transistor Q1 is inhibited from be turned ON and OFF, with no voltage being induced in the secondary winding T3 thereby interrupting the charging current to the secondary battery 23. Thus, the charging is finished.

Figure 5:
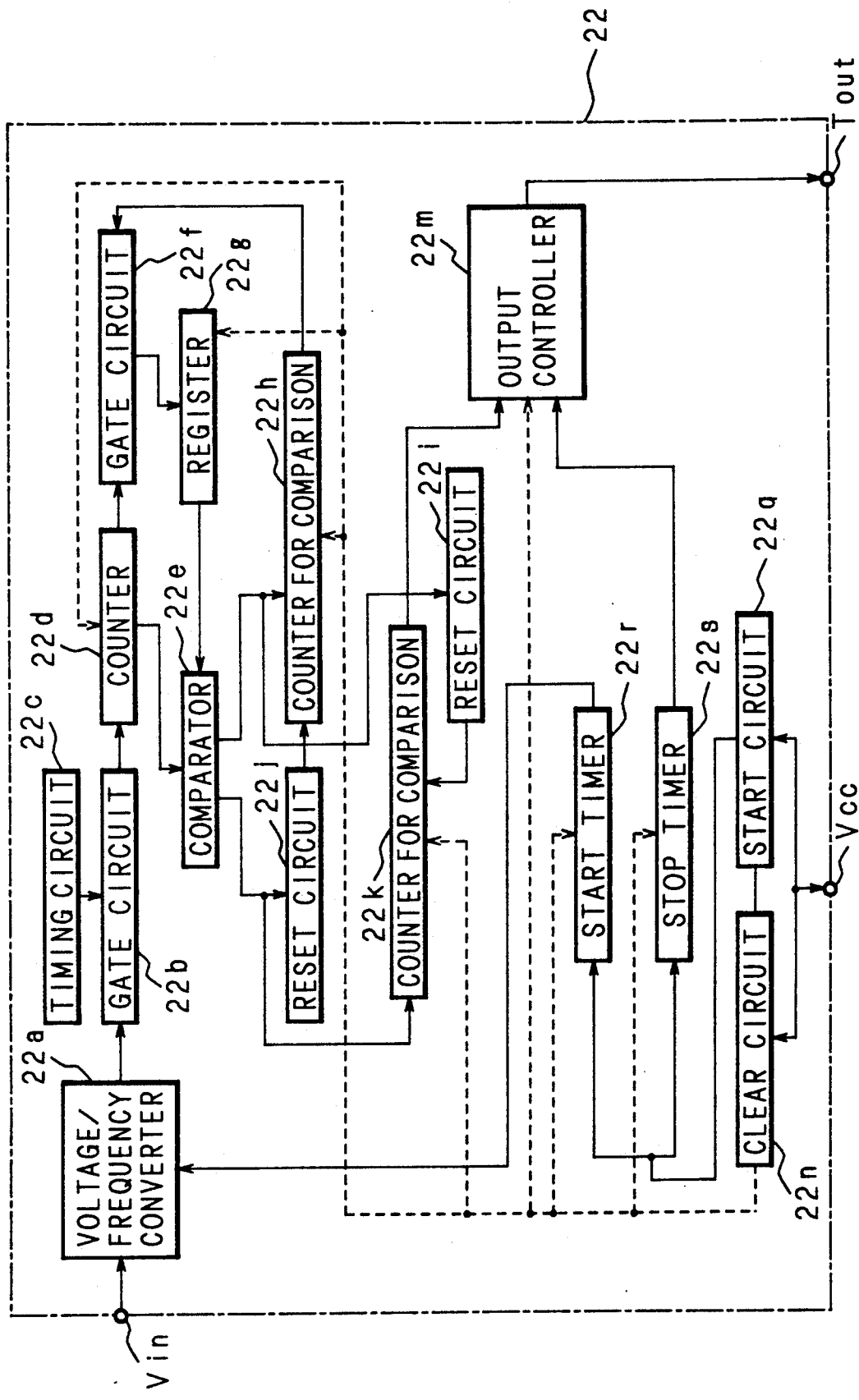
FIG. 5 is a block diagram of a charging control circuit of FIG. 4.

FIG. 5 is a block diagram of the charging control circuit 22 of FIG. 4. The terminal voltage of the secondary battery 23 inputted to the input terminal Vin is inputted to a voltage/frequency converter 22a which converts the voltage to pulses of a frequency corresponding to the voltage. The converted pulses are inputted to a first gate circuit 22b. Since the gate circuit 22b is fed with a gate signal from a timing circuit 22c, the gate circuit 22b opens its gate for a time period $T_2$ with a cycle $T_1$ as indicated in a graph of FIG. 7. The time period $T_2$ should be so long as ensures perfect detecting of the terminal voltage of the secondary battery 23. For example, in quickly charging the secondary battery 23 for one hour, the time period $T_2$ is set to be 5-10 seconds. The pulses outputted from the gate circuit 22b are inputted to a counter 22d which in turn counts the number of the pulses inputted. The counting number of the counter 22d is inputted to a comparator 22e and a second gate circuit 22f. A register 22g updates the counting number inputted to the gate circuit 22f to the maximum counting number and stores the maximum counting number. The content of the register 22g is supplied to the comparator 22e. The comparator 22e outputs a first signal both to a first counter 22h for comparison and to a second reset circuit 22i when the counting number outputted from the counter 22d is larger than the value from the register 22g. In contrast, when the counting number from the counter 22d is smaller than the value from the register 22g, the comparator 22e generates a second signal to a first reset circuit 22j and a second counter 22k for comparison. A reset signal outputted from the reset circuit 22j is inputted to a reset terminal of the counter 22h for comparison. The counter 22h for comparison generates an output as a gate signal, when the counting number becomes a predetermined value, to the gate circuit 22f like a preset counter. The counting number of the counter 22d outputted from the gate circuit 22f is inputted to and stored in the register 22g. A reset signal outputted from the reset circuit 22i is inputted to the counter 22k for comparison. The counter 22k for comparison generates an output like a preset counter to an output controller 22m when the counting number becomes a predetermined value. The charging end signal from the output controller 22m is outputted to the output terminal Tout.

The voltage of a direct current source is fed to the power source terminal Vcc and to a clear circuit 22n which clears the counter 22d, register 22g, counters 22h, 22k for comparison, etc. and a start circuit 22q. An output from the start circuit 22q is fed to a start timer 22r and a stop timer 22s. A limiting output from the start timer 22r is supplied to the voltage/frequency converter 22a and a limiting output from the stop timer 22s is sent to the output controller 22m. An output of the clear circuit 22n is sent to each of the counter 22d, register 22g, counters 22h, 22k for comparison, output controller 22m, start timer 22r and stop timer 22s.

The charging control circuit 22 in the above-described construction operates in the following manner to be discussed with reference to FIGS. 6 and 7.

As indicated in FIG. 4, when the alternating current voltage of the alternating current source 21 is applied between the power source terminals t1 and t2 while the secondary battery 23 to be charged is connected to the charging apparatus, the direct current voltage which is the output voltage from the rectifying bridge D1 is applied to the power source terminal Vcc of the charging control circuit 22, and the terminal voltage of the secondary battery 23 is applied to the input terminal Vin. Accordingly, the charging apparatus is ready to charge the secondary battery 23.

When the direct current voltage is applied to the power source terminal Vcc of the charging control circuit 22, as shown in FIG. 5, the clear signal is outputted from the clear circuit 22n to the counter 22d, register 22g, counters 22h, 22k for comparison, output controller 22m, start timer 22r and stop timer 22s. In consequence, the start circuit 22q generates an output to actuate the start timer 22r and strop timer 22s. The start timer 22r, while counting a considerably short time, generates an output to the voltage/frequency converter 22a, whereby the converting operation is temporarily stopped. This is to prevent that the charging operation is interrupted at the initial stage if the secondary battery 23 is in the inactive state.

Figure 6:
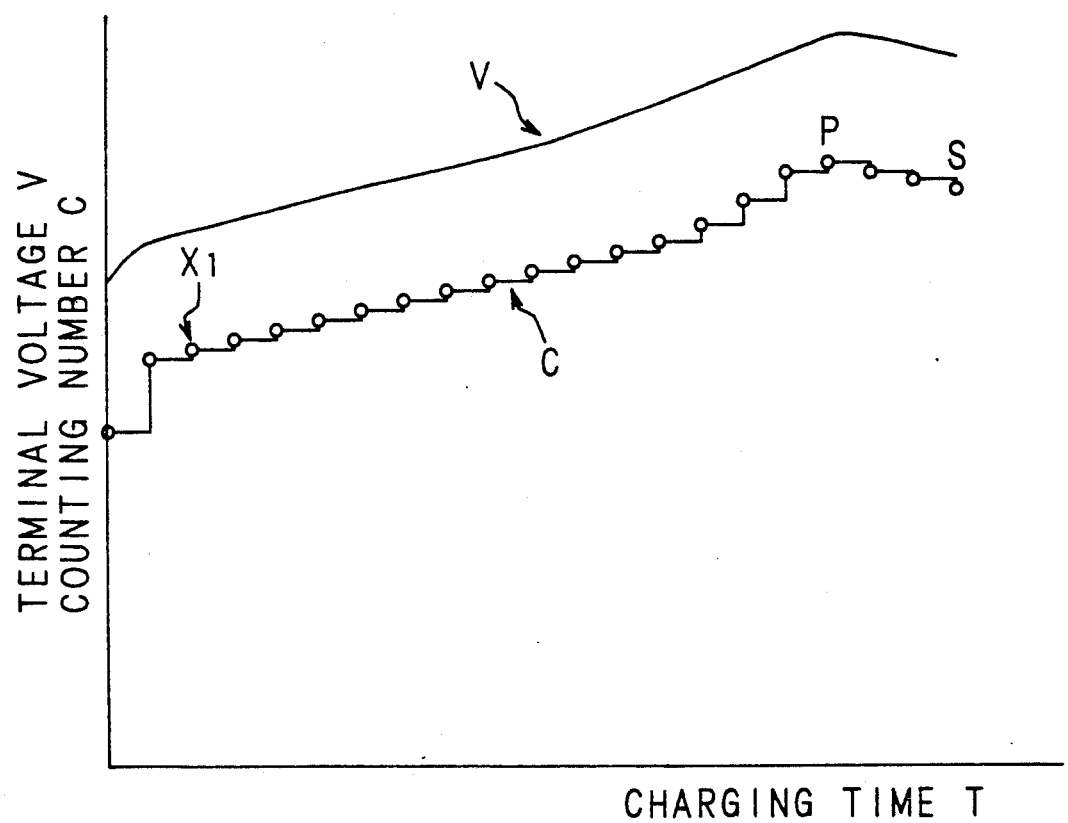
FIG. 6 is a graph showing the relation among the charging time, terminal voltage of a secondary battery and counting value of a counter.

As the secondary battery 23 is charged, the terminal voltage is raised as indicated by a curve V of FIG. 6. On the other hand, the stop timer 22s continues counting before the proper charging time for the secondary battery 23 lapses.

Now, assuming that the start timer 22s completes counting, with its output disappearing, the voltage/frequency converter 22a starts to convert the voltage to a frequency, and inputs the pulses of the frequency corresponding to the input voltage to the gate circuit 22b.

Figure 7:
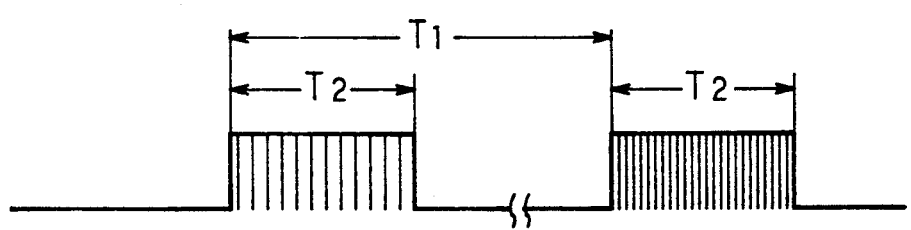
FIG. 7 is a diagram explanatory of the state where the converted pulses of a frequency are sampled.

The gate circuit 22b opens its gate for the time period $T_2$ with the cycle $T_1$ shown in FIG. 7 in response to the gate signal from the timing circuit 22c. Accordingly, the pulses within the time period $T_2$ are counted by the counter 22d. The counting number of the counter 22d is inputted to the gate circuit 22f and the comparator 22e. The comparator 22e compares the maximum counting number of the register 22g (the initial value is 0) and the counting number of the counter 22d. For every comparison, if the counting number of the counter 22d is not smaller than the maximum counting number of the register 22g, the first signal is inputted from the comparator 22e to the counter 22h for comparison. The counter 22h for comparison generates an output to the gate circuit 22f when the comparator 22e outputs the first signal successively for a predetermined number of times. Accordingly, the gate of the gate circuit 22f is opened, and the counting number of the counter 22d is inputted to the register 22g, so that the maximum counting number of the register 22g is updated. In other word, the rise of the terminal voltage of the secondary battery 23 is detected at a time point $X_1$ of FIG. 6. Thereafter, the updated maximum counting number is inputted to the comparator 22e, where the counting number of the counter 22d is compared with the maximum counting number. If the terminal voltage V of the secondary battery 23 is in the rising process, the maximum counting number of the register 22g is updated again.

The above operation is continued for the charging time of the secondary battery 23 to follow the rise of the terminal voltage of the secondary battery 23.

It is to be noted here that the comparator 22e generates the second signal to the reset circuit 22j thereby to reset the counting number of the counter 22h for comparison in the case where the voltage of the alternating current source 21 is suddenly reduced during the charging time because of noises, etc. and the counting number of the counter 22d becomes not larger than the maximum counting number. Therefore, the maximum counting number is never updated in response to the abnormal change of the terminal voltage of the secondary battery 23. The terminal voltage of the secondary battery 23 can be correctly detected without any influences by the noises or the like.

In the meantime when the secondary battery 23 is completely charged, the terminal voltage V becomes lower as shown in FIG. 6, and therefore the counting number of the counter 22d is reduced. When the counting number of the counter 22d is detected to be smaller than the maximum counting number through comparison therebetween by the comparator 22e, the comparator 22e generates the second signal to the counter 22k for comparison.

Accordingly, the maximum counting number of the register 22g comes not to be updated. When the second signal is outputted a predetermined number of times from the comparator 22e to the counter 22k for comparison, for example, 2-5 times in succession, the counter 22k for comparison generates an output to the output controller 22m. If the counting number inputted to the comparator 22e exceeds the maximum counting number for a moment due to the abnormal change of the terminal voltage of the secondary battery 23, the first signal is inputted to the reset circuit 22i and the counter 22k for comparison is reset. Therefore, the counter 22k for comparison generates an output only when the second signal is outputted thereto a predetermined number of times successively from the comparator 22e after the terminal voltage of the secondary battery 23 reaches the maximum point (a point P in FIG. 6). The counter 22k for comparison can be prevented from generating the output erroneously due to the abnormal change of the terminal voltage of the secondary battery 23.

When the output of the counter 22k for comparison is inputted to the output controller 22m, the output controller 22m outputs the charging end signal to the output terminal Tout. As mentioned earlier, the charging end signal is sent to the base of the transistor Q2 (referring to FIG. 4), thereby shutting the input current to the high-frequency transformer T. Thus, the charging operation of the secondary batter 23 is finished at a time point S of FIG. 6.

Meanwhile, in the case where the charging time for the secondary battery 23 is elongated over the proper time because of some reasons, the stop timer 22s stops counting, and outputs the limiting output to the output controller 22m. Accordingly, in this case as well, the output controller 22m generates the charging end signal to the output terminal Tout, thereby finishing the charging operation. The secondary battery 23 can be prevented from being overcharged.

As described hereinabove, according to this invention, since the terminal voltage of the secondary battery is converted to pulses of a frequency corresponding to the voltage, the converted pulses are counted periodically, and the counting number is compared with the maximum counting number, the charging state of the secondary battery can be correctly detected, and the time point to end the charging can be properly obtained. Moreover, an IC can be used for such conversion, counting and comparison, the charging control circuit may be made compact in size easily. In addition, even when the terminal voltage of the secondary battery is changed a moment because of the noises, owing to the counter for comparison, the ending time point is not detected wrong at all.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A voltage sampling apparatus for sampling the voltage of a battery, comprising:
    voltage/frequency converting means for converting the voltage of said battery to pulses of a frequency corresponding to the voltage;
    a counter for counting said pulses and providing a series of counts on a predetermined cycle; and
    comparator means for evaluating successive counts in said series to detect a change in said voltage.

2. A voltage sampling apparatus as set forth in claim 1, wherein said counter counts for a period longer than half a cycle of an alternating current source for use in charging said battery.

3. A charging apparatus which samples the voltage of a battery to control a charging current of said battery on the basis of the change in the voltage of said battery, comprising:
    sampling means, for sampling the voltage of said battery, including a voltage/frequency converter which converts the voltage of said battery to pulses of a frequency corresponding to the voltage, and a counter which counts said pulses and provides a series of counting numbers representative of the frequency of said pulses on a predetermined cycle; and
    control means for controlling the charging current of said battery on the basis of the counting number of said counter, including comparator means for evaluating successive counting numbers in said cycle.

4. A charging apparatus as set forth in claim 3, wherein said counter counts for a period longer than half a cycle of an alternating current source for use in charging said battery.

5. A charging apparatus which samples the voltage of a battery to control a charging current of said battery on the basis of the change in the voltage of said battery, comprising:
    sampling means, for sampling the voltage of said battery, including a voltage/frequency converter which converts the voltage of said battery to pulses of a frequency corresponding to the voltage,
    a counter which counts said pulses and provides a series of counting numbers representative of the frequency of said pulses on a predetermined cycle; and
    control means for controlling the charging current of said battery on the basis of the counting number of said counter, including comparator means for evaluating successive counting numbers in said cycle, and detecting means for detecting the counting number of said counter to output a signal when a counting number in said series is less than the preceding counting number, and stopping means for stopping the charging current of said battery upon receipt of said signal from said detecting means.

6. A charging apparatus which samples the voltage of a battery to control a charging current of said battery on the basis of the change in the voltage of said battery, comprising:
    sampling means, for sampling the voltage of said battery, including a voltage/frequency converter which converts the voltage of said battery to pulses of a frequency corresponding to the voltage,
    a counter which counts said pulses and provides a series of counting numbers representative of the frequency of said pulses on a predetermined cycle;
    control means for controlling the charging current of said battery on the basis of the counting number of said counter, including comparator means for evaluating successive counting numbers in said cycle;
    first signal generating means for generating an inhibiting signal for a first predetermined time period after the start of the charging current of said battery to inhibit the counting by said counter; and
    second signal generating means for generating a control signal a second predetermined time later from the start of the charging current of said battery irrespective of the counting number of said counter for causing said control means to control the charging current of said battery.

7. A charging apparatus for charging a battery, comprising:
   voltage/frequency converting means for converting the voltage of said battery to pulses of a frequency corresponding to the voltage;
   a first counter for counting said pulses and for providing a series of counting numbers representative of the frequency of said pulses on a predetermined cycle;
   a register for storing the maximum counting number of said first counter;
   a comparator which compares the counting number of said first counter with the content stored in said register and outputs a first signal when the counting number of said first counter is smaller than the content of said register;
   a second counter for counting the number of first signals output from said comparator and for generating a second signal when said number of first signals reaches a predetermined number; and
   control means for controlling the charging of said battery on the basis of said second signal from said second counter.

8. A charging apparatus as set forth in claim 7, wherein said predetermined number is at least two.

9. A charging apparatus for charging a battery, comprising:
   voltage/frequency converting means for converting the voltage of said battery to pulses of a frequency corresponding to the voltage;
   a first counter for counting said pulses and for providing a series of counting numbers representative of the frequency of said pulses on a predetermined cycle;
   a register for storing the maximum counting number of said first counter;
   a comparator which compares the counting number of said first counter with the content stored in said register for generating a first signal when the counting number of said first counter is larger than the content of said register and for generating a second signal when the counting number of said first counter is smaller than the content of said register;
   a second counter for counting the number of first signals from said comparator and for updating the content of said register to the counting number of said first counter, when the number of first signals reaches a first predetermined number;
   a third counter for counting the number of second signals from said comparator and for generating a third signal when the number of second signals reaches a second predetermined number; and
   control means for controlling the charging of said secondary battery on the basis of said third signal from said third counter.

10. A charging apparatus as set forth in claim 9, wherein said second predetermined number is at least two.

* * * * *